United States Patent [19]

Williams et al.

[11] 4,401,264
[45] Aug. 30, 1983

[54] RELIEF VALVE

[75] Inventors: Michael R. Williams; Dean McDonald, both of Jonesboro, Ark.

[73] Assignee: FMC Corporation, Chicago, Ill.

[21] Appl. No.: 862,785

[22] Filed: Dec. 21, 1977

Related U.S. Application Data

[63] Continuation of Ser. No. 679,534, Apr. 23, 1976, abandoned.

[51] Int. Cl.³ .............................................. B05B 9/00
[52] U.S. Cl. ..................................... 239/126; 137/509
[58] Field of Search ............... 239/126, 127; 137/469, 137/509, 484.7; 251/63.6

[56] References Cited

U.S. PATENT DOCUMENTS

| | | | |
|---|---|---|---|
| 2,086,295 | 7/1937 | Ernst | 137/509 |
| 2,102,865 | 12/1937 | Vickers | 137/509 X |
| 2,127,172 | 8/1938 | Hermitte | 239/127 X |
| 2,290,080 | 7/1942 | Wahlmark | 137/509 X |
| 3,144,075 | 8/1964 | Jackson | 239/126 |
| 3,856,043 | 12/1974 | Field et al. | 137/508 |

*Primary Examiner*—John J. Love
*Assistant Examiner*—Gene A. Church
*Attorney, Agent, or Firm*—Ronald C. Kamp; Richard B. Megley

[57] ABSTRACT

A relief valve which maintains generally constant pressure in a fluid system for a wide range of flow rates through the system. When the valve opens as the pressure in the system exceeds a predetermined value, the flow about the valve plug is allowed to impinge on itself adjacent to the bottom surface of the plug to create a stagnation pressure on the plug which maintains generally constant liquid pressure within the valve for different plug settings even though the spring force on the plug increases as the flow increases and the plug is lifted further from its seat.

3 Claims, 10 Drawing Figures

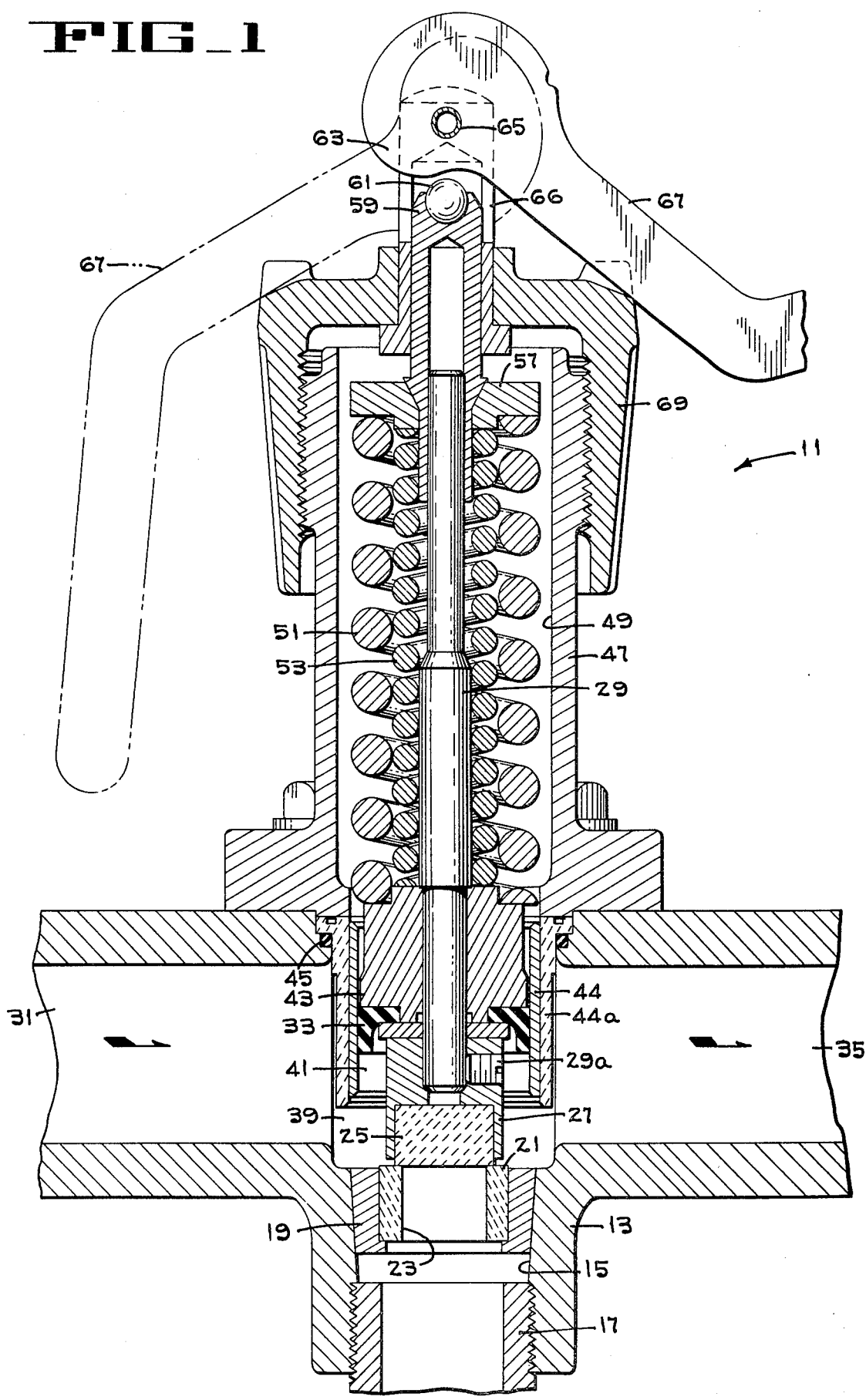
FIG_1

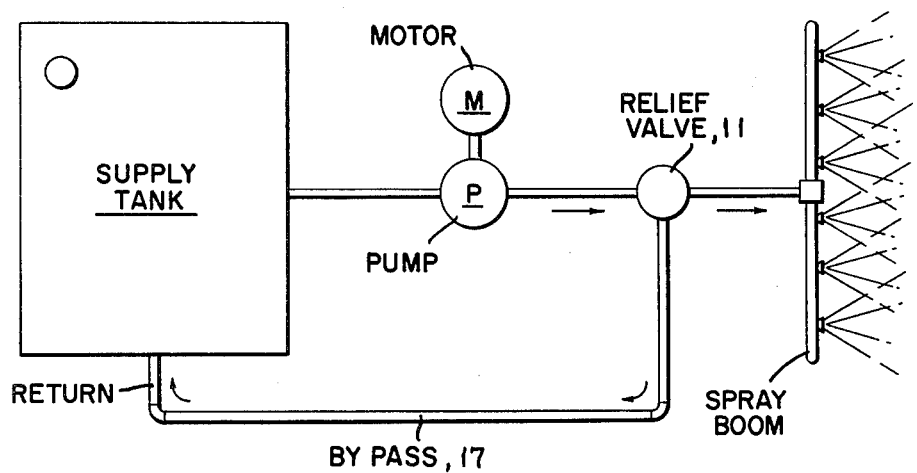
FIG_2
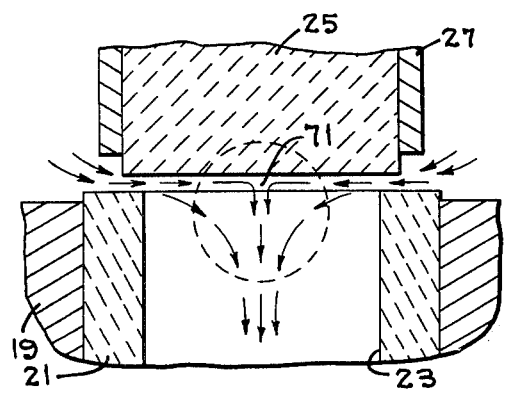
FIG_3
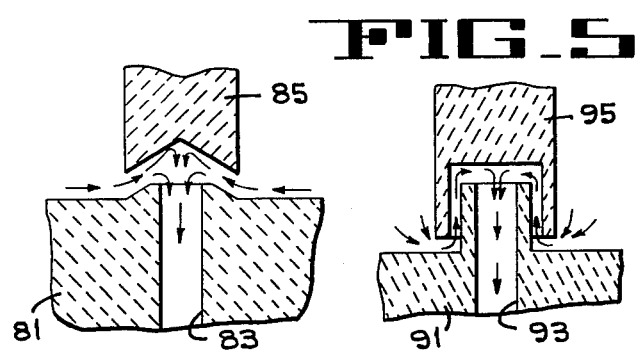
FIG_4  FIG_5
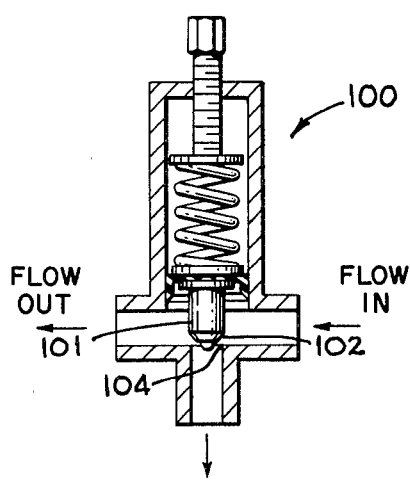
FIG_6
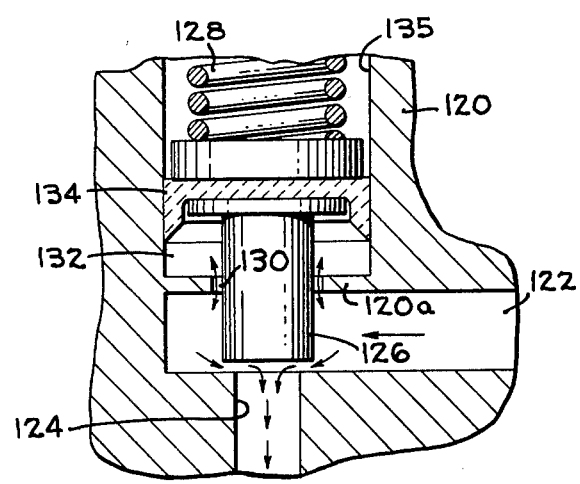
FIG_7

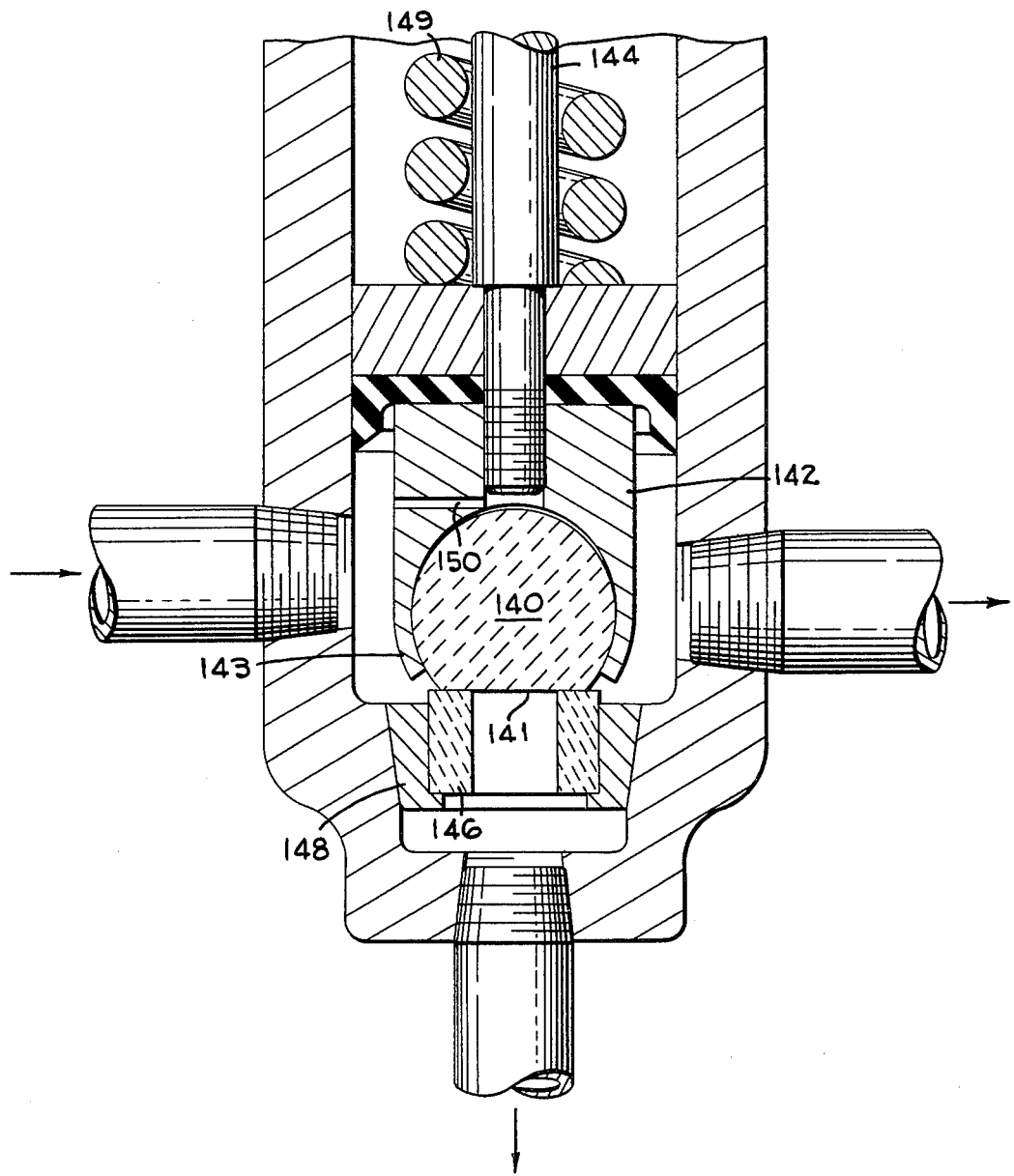
FIG_8

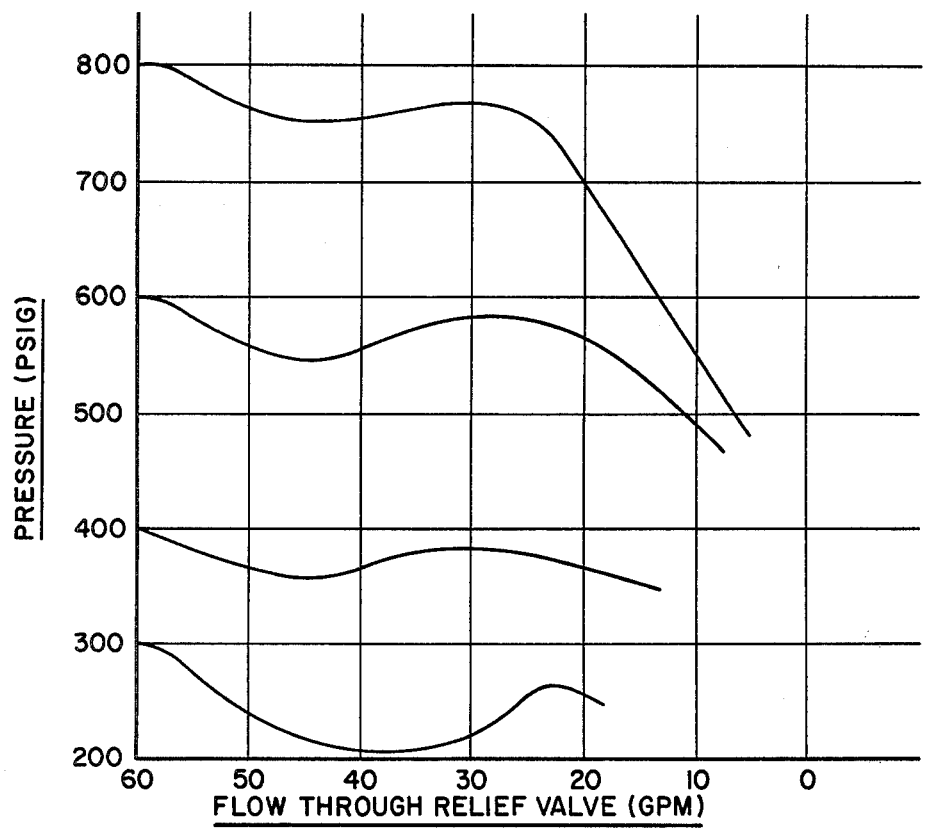
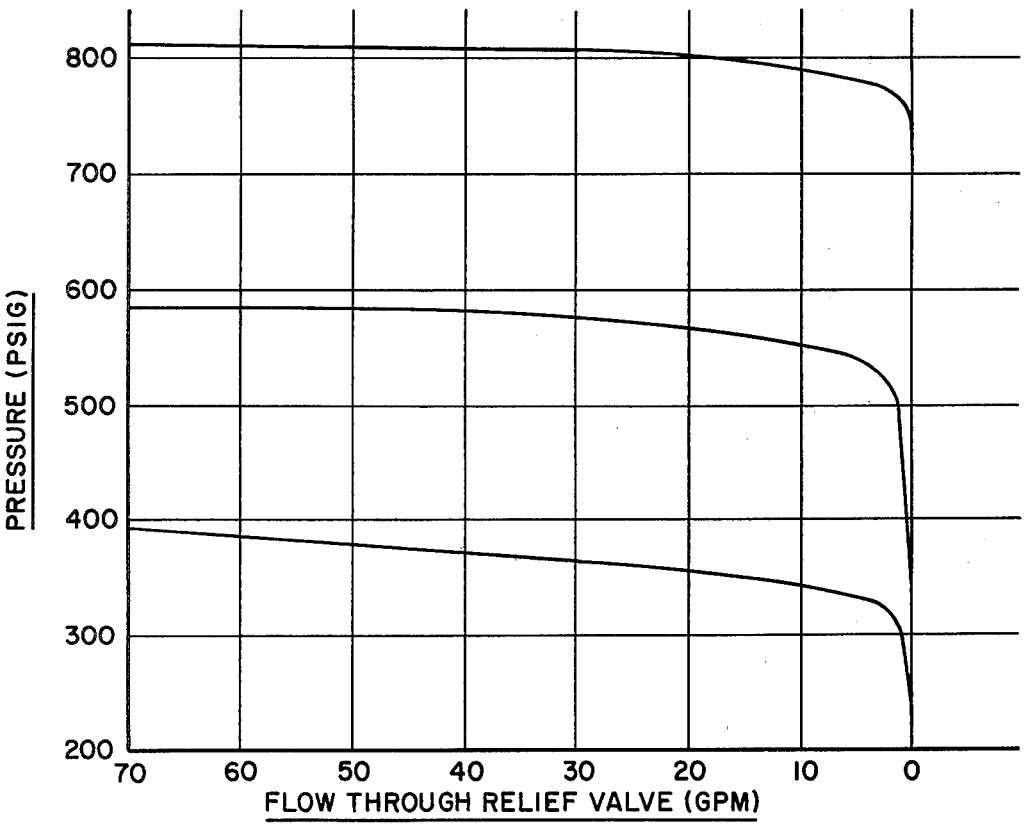

RELIEF VALVE

This is a continuation of application Ser. No. 679,534 filed Apr. 23, 1976 now abandoned.

BACKGROUND OF THE INVENTION

1. Field of the Invention

This invention pertains to relief valves.

2. Description of the Prior Art

A relief valve in a liquid flow system is used as a bypass means for bleeding off a portion of the flowing liquid when, for example, one or more of the outlet passages of the flow system is closed to flow of the liquid. This often gives rise to a phenomenon known as relief valve "pressure droop", a detrimental drop in the pressure in the system as the bypass flow through the relief valve is reduced. In a conventional relief valve, small bypass flow rates therethrough correspond to small valve plug lift heights, corresponding to small spring deflections where a spring acts to urge the relief valve plug against its corresponding seat. In a conventional relief valve, the force required to lift the valve plug off its seat is determined solely by the compressive spring force. This force is opposed by the liquid pressure acting upwardly on a surface (hereinafter called the control surface) located above the liquid plenum associated with the valve, the control surface being connected with the surface upon which the spring force acts. The pressure at which the system operates is controlled by adjusting the initial compression of the spring. An equilibrium is established in which the spring deflection force equals the control surface pressure lifting force. If the flow rate through the relief valve is increased, the plug must be lifted higher off its seat to pass the increased flow at the same pressure. As the flow rate is reduced, back pressure throttled through the valve is also reduced; thus, a reduced pressure acts on the control surface and the upward force opposing the spring force is reduced. The spring then urges the valve downwardly, and a new, lower equilibrium plenum pressure is established corresponding to a smaller upward spring deflection. The accompanying undesirable decrease in plenum pressure as the flow rate is reduced is commonly known as "pressure droop".

U.S. Pat. No. 3,107,894 to Quinn teaches a valve plug and seat arrangement wherein the liquid flowing through the valve creates a force acting on the underside of the valve plug, tending to further open the valve. Quinn uses a frusto-conically shaped valve seat wall portion and a tapered valve plug to create a Venturi effect whereby the associated pressure differential assists in the rapid opening of the valve.

U.S. Pat. No. 2,622,613 to McNeal discloses a pressure control valve wherein the hydrokinetic force of the liquid, which is perpendicularly incident upon the control surface of the valve, holds the valve in an open position, and cylinders within the valve passageway create a dampening action to stabilize operation of the valve.

U.S. Pat. No. 2,804,089 and No. 2,755,815 to Siefferle and Erle, respectively, disclose pressure regulating valves with substantially different structures from the apparatus herein disclosed, such structures using the hydrokinetic forces of the flowing liquid to maintain a fairly constant discharge pressure in the valve over a range of flow rates.

SUMMARY OF THE INVENTION

The present invention comprises an improved liquid flow system of the type including a pump, a consumption device, a relief valve, and lines connecting the valve, pump and consumption device. The relief valve includes a valve plug acted on by a spring mounted in a chamber which is exposed to atmospheric pressure. The seat and plug of the valve have opposing flat and parallel surfaces, and the bypass port of the valve communicates with a bypass passageway formed axially through the seat, whereby the relief valve can maintain nearly constant system pressure for a wide range of liquid flow rates by utilizing the hydrokinetic energy of the flowing liquid to create a lifting force which will vary with flow rate through the bypass passageway and which will balance the increased spring forces on the valve plug at increased bypass flow rates. The valve apparatus of the present invention thus generally comprises a valve seat with a bypass passageway therethrough, a valve plug positioned adjacent to and closing upon the seat, spring means urging the plug onto the seat, liquid inlet and exit conduits communicating with the valve seat passageway when the plug is lifted off the seat, and a bottom surface on the valve plug which allows the liquid passing through the valve to flow radially inward and impinge upon itself when plug and seat are spaced apart.

The opposed, flat seat and plug surfaces of the relief valve of the subject invention cooperate to provide an extra force on the valve plug bottom surface due to a stagnation pressure which acts upwardly on said bottom surface. This extra force is produced by the impingement upon itself of the radially inwardly flowing bypass fluid, and such force increases as the flow rate of the flow bypassed from the consumption device increases. As a result, the net spring force sensed by the valve plug, and thus the fluid pressure in the plenum, remains nearly constant over a wide range of flow rates from the consumption device of the system (including low flow rates of liquid down to nearly zero) irrespective of the size of the bypass passageway in the valve seat. The magnitude of the resulting stagnation pressure may be controlled by the choice of shape of the bottom surface of the valve plug. The preferred embodiment discussed herein uses an entirely flat lower face on the valve plug, but other configurations may also be used.

It is a primary object of the subject invention to provide a relief valve in a liquid flow system which will maintain nearly constant liquid pressure within the valve liquid flow system over a large range of liquid flow rates from the consumption device of the system.

BRIEF DESCRIPTION OF THE DRAWINGS

FIG. 1 is a vertical section through the relief valve of the present invention.

FIG. 2 is a schematic representation of the relief valve as used in a typical environment, e.g., to control discharge pressure in a spray boom.

FIG. 3 is an enlarged section of the valve seat and plug area of the relief valve of FIG. 1, particularly showing the liquid flow pattern developed.

FIG. 4 is a section similar to FIG. 3 but showing the liquid flow pattern developed in a second embodiment of the invention.

FIG. 5 is a section similar to FIG. 3 but showing the liquid flow pattern developed in a third embodiment of the invention.

FIG. 6 is a section through a relief valve which is representative of the prior art.

FIG. 7 is a detail sectional view of the valve seat and plug area of a fourth embodiment of the present invention, such embodiment including a pressure pulsation dampening apparatus.

FIG. 8 is a partial vertical section through a fifth embodiment of the present invention which utilizes a modified valve plug mounting arrangement.

FIG. 9 is a graph showing valve internal pressure developed as a function of liquid flow rate for the representative prior art relief valve of FIG. 6.

FIG. 10 is a chart showing valve internal pressure developed as a function of liquid flow rate for the valve of FIG. 2.

DESCRIPTION OF THE PREFERRED EMBODIMENT

FIG. 2 schematically illustrates a representative application of the relief valve 11 of the present invention in a spray boom system. The spray liquid is transported under pressure (e.g., 500 psi) by a pump P to the relief valve and thence to a spray boom for deposit on a farm crop or the like through a plurality of spray nozzles. If one or more of the spray nozzles is closed, the internal pressure in the system will increase accordingly unless a portion of the liquid is bled off via the relief valve bypass to maintain the internal pressure at the predetermined value (500 psi). The subject invention provides means for controlling the separation of plug and seat in the relief valve so as to maintain nearly constant internal pressure within the valve even though the flow rates through the valve will vary greatly as anywhere from one to six of the illustrated spray nozzles are operated.

With reference to FIG. 1, the relief valve of the present invention will be seen to comprise a valve housing member 13 which defines a vertical passageway, or bypass, passageway 15 used for bypass of liquid in the relief valve. A bypass pipe 17 is threadedly mounted in and coaxial with the passageway 15 for passing the bypassed fluid, at substantially zero pressure, to the pump reservoir or to another discharge location. A valve seat 19 of annular configuration is force fitted against the upper inner circumference of the passageway 15 of housing 13, and an annular ceramic insert 21 is secured snugly within the inner circumference of the valve seat 19 by a heat-shrinking process so as to define an axial passageway 23 therethrough. The ceramic insert serves to protect the metal surfaces of the seat 19 from erosion by the high velocity liquid.

The valve plug will be seen to comprise a lower plug component 25 of ceramic with a flat lower face which is arranged to abut against the upper annular surface of the ceramic insert 21 and an upper plug component 27 of metal which includes a cylindrical recess that securely mounts the lower plug component. The aforementioned heat-shrinking process is used to secure the ceramic lower component 25 within the cylindrical recess of the upper plug component 27. A valve stem 29 extends vertically upwardly from the plug to which it is tightly secured by a set screw 29a.

With regard to the heat shrinking process as applied to the construction of the valve seat, for example, one begins with an annular ceramic insert 21 of uniform cross-section whose outer radius is slightly larger, at room temperature, than the interior radius of the metal outer component 19 of the valve seat to which it is to be fitted. The portion of the valve seat adjacent to the ceramic insert must also be of uniform cross-section to avoid development of any localized or point stresses when metal and ceramic contact one another after cooldown; if localized stresses develop and are of sufficient magnitude, the ceramic insert may crack or split under the forces. By insuring that the metal outer component 19 is also of uniform cross-section in this area, one insures that the circumferential stresses developed upon cooldown will be reasonably uniform over the circumferential area of contact.

In performing the operation, the metal outer component 19 is heated to a temperature where the associated circumferential thermal expansion of the inner circumference is sufficient to permit the annular ceramic insert 21 to be slipped within the inner circumference. The outer seat component 19 is now allowed to cool down slowly so as to contact the ceramic insert uniformly along the outer circumference of the insert. As a result of the subsequent cooldown, the metal outer component will shrink and be placed in circumferential tension while the ceramic insert will be in circumferential compression. Ceramic material is known to be weak and susceptible to cracking when said material is in tension, but the material develops additional strength when it is placed in compression as in the described process. The use of the heat shrinking process to fit the ceramic inserts 21 and 25 to the outer metal components 19 and 27, respectively, avoids the necessity for "gluing" ceramic and metal together which has been found to produce an uncertain bond between metal and ceramic and to leave the ceramic susceptible to cracking. As a peripheral benefit, where the heat shrinking process is employed the ceramic insert may be removed for replacement by merely reversing the process, i.e., the metal outer component is reheated and the ceramic insert is removed.

Ingress of the system liquid to the relief valve occurs via the passageway 31 in the valve housing 13, a liquid egress occurs via the passageway 35 in the housing 13 with the liquid passing around the valve plug component 27 as it flows through the valve. It will be recognized, however, that only one passageway is necessary where the relief valve does not function to pass the system flow as, for example, where the relief valve is positioned in a bypass conduit rather than in the main flow conduit as shown. The incoming pressurized liquid in the passageway 31 enters a plenum 39 defined by the annular region surrounding the valve plug components 25 and 27, moves around the plug, and exits via the passageway 35 when the valve plug closed upon its seat. With the valve plug and seat spaced apart, a portion of this flowing liquid is bypassed through the passageway 15. A portion of the liquid about the plug also flows into an upper plenum 41 which is defined by the annular region surrounding the upper valve plug component 27. The liquid in the plenum 41 exerts upwardly directed vertical forces upon an annular piston 43 through a packing member 33 tending to move the piston, the valve plug, and the attached valve stem 29 upwardly. The piston 43 vertically reciprocates inside a cylindrical bearing 44 fitted within a retainer 44a which is secured to the housing 13 and which is protected against leakage by an O-ring seal 45 strategically placed as shown.

Lying above the two plenums 39 and 41 is a cylindrically shaped spring housing 47 which is bolted at its lower end to the valve housing 13. The spring housing defines a vertically extending cavity 49 containing a pair of vertically oriented springs 51 and 53 used to urge the valve plug 25 downwardly upon the valve seat 21.

The springs 51 and 53 are used to obtain the necessary spring force, nominally about 800 pounds spring force where the relief valve is set to open at 500 psi. The two springs seat upon the upper face of the piston 43 surrounding the valve stem 29. At the upper end of the spring housing an upper spring retainer 57, which is positioned about the upper end of the stem 29, acts as an adjustable base against which each spring is referenced. The springs resist the upward movement of the valve plug and piston which is caused by the presence of the pressurized liquid within the plenum 41. The springs are chosen so that they just suffice to keep the valve plug 25 closed upon the valve seat 21 when the fluid in the system is pressurized to the maximum desired pressure.

The upper portion of the stem 29 is provided with a cap 59 which fits slidably around said stem at the top and acts as a guide for said stem. The cap also serves to mount the upper spring retainer 57 in its desired position. The top portion of this cap contains a rotatable sphere 61. A cam 63 journaled at 65 is mounted upon a mounting member 66 so that the lower surface of the cam can be moved into engagement with the sphere 61. The cam 63 is attached to a handle 67 which serves to raise and lower the cap 59 and the upper spring retainer 57 as the cam 63 is rotated to engage sphere 61. With the handle at the phantom line position, shown in FIG. 1, the upper spring retainer 57, the springs 51 and 53, and the valve plug will be driven downwardly so that the plug closes upon the valve seat with its desired initial spring compression. When the handle is rotated to the full line position shown in FIG. 1, the valve stem 29 is released to move upwardly and the initial spring compression is removed. The valve plug may then be lifted and spaced apart from the valve seat 21 with a minimum of liquid pressure allowing liquid to flow through the discharge passageway 15 for the purpose of bypass at low pressure.

Finally, a cap 69 surrounds the upper portion of the spring housing 47 wherein the springs 51 and 53 are placed. This cap is threaded to the housing and secures the mounting member 66 in position to thereby provide a means for adjusting initial spring compression and thus adjusting the discharge pressure in the system.

Referring now to the detail view of FIG. 3 it will be seen that as soon as the valve plug 25 is raised off the valve seat 21, a flow pattern will develop as shown. The liquid, under more or less uniform pressure on all sides of the valve plug, moves radially inward and impinges upon itself at the top center 71 of the axial passageway 23. At this point the liquid changes direction, losing much of its hydrokinetic energy in the process. This creates a region 73 (shown roughly by the dotted lines in FIG. 3) of stagnation pressure, reflecting the local loss of hydrokinetic energy of the liquid. This stagnation pressure acts approximately equally in all directions, normal to the imaginary sphere 73 as shown. In particular, this stagnation pressure acts with a net upward force upon the lower face of the lower plug component 25 and thus provides an additional lifting force acting to urge the valve plug upwardly against the downwardly directed spring forces. It must be remembered that this pressure will increase as the flow through the valve increases. Thus, while the resisting spring force will increase as the springs 51 and 53 are compressed further for larger flows, the stagnation pressure will increase accordingly to offset this increase in the spring force and the system pressure will remain approximately the same.

FIGS. 4 and 5 disclose modified configurations for the valve plug and the valve seat of the relief valve of the present invention. In FIG. 4, the valve plug 85 and the valve seat 81 are configured so that the fluid makes approximately a 120° turn in direction at the center of the underside of the plug before entering the axial passageway 83 through the valve seat. The hydrokinetic energy loss here is of a higher magnitude than the corresponding loss in the embodiment of FIG. 1, and the stagnation pressure thereby developed under the valve plug can be expected to be larger; this will result in increased lifting forces acting on the underside of the plug as the flow rate increases whereby greater increases in resisting spring force can be equalized.

In the FIG. 5 embodiment, the valve plug 95 and valve seat 91 are configured so that the liquid undergoes three 90° turns before preceding down the axial passageway 93 in the valve seat. Some hydrokinetic energy is lost at each turn. By thus restricting the stream expansion, a greater force is developed beneath the valve plug for increasing flow rates to counteract increasing spring forces.

FIG. 6 discloses a representative prior art relief valve 100 with the lower portion of the valve plug 101 being a downwardly converging frusto-conical element 102. With the valve plug spaced slightly apart from the annular rim defining the valve seat 104, the liquid in the valve is deflected downwardly so as not to lose too much of its kinetic energy and does not impinge upon itself. Thus, any increase in spring force at larger valve openings will mean a correspondingly higher system pressure at such larger valve openings.

The subject invention disclosed in FIGS. 2-5, utilizing a flat or upwardly converging plug lower face, achieves a positive pressure differential beneath the plug which increases with increasing flow between valve plug and seat so as to approximately equalize the internal valve system pressure for most flow rates.

FIG. 7 discloses an alternative embodiment of the invention which includes means for dampening pressure pulsations or other rapid changes in system pressure which may occur during flow through the valve. In the FIG. 7 embodiment, the valve body 120 is provided with a passageway 122 which is in communication with the main flow conduit in the flow system. A bypass passageway 124 is connected with the passageway 122 and is arranged to be normally sealed off by the lower face of a cylindrical plug member 126. The valve plug member is forced by spring 128 into engagement with a flat annular surface surrounding the upper end of the passageway 124. The valve body includes a narrow projecting wall 120a which surrounds the cylindrical plug member 126 but is slightly spaced therefrom so as to provide a narrow annular passageway 130 therebetween. Above the wall 120a a variable chamber 132 is provided, the size of such chamber depending on the position of packing member 134 within the recess 135 within which the valve plug and its supporting structure reciprocate as flow increases or decreases through the valve. It will be seen that any increases or decreases in flow rate (while the relief valve is open) require liquid to pass through the narrow annular passageway 130 either to or from the chamber 132. Since the passageway 130 is restricted, such flow can occur only at a limited rate, and, thus, the restricted passageway acts to damp out any rapid pressure variations in the system.

In contrast to the oil-filled hydraulic dampeners of the prior art, it will be seen that the dampener of the present invention, which utilizes only the liquid flowing in the system, is more easily maintained and is more reliable since no additional sealing members or external hydraulic control system are required. Also, heat build-up in the dampener is eliminated.

Referring now to FIG. 8, a further embodiment of the invention is shown wherein the valve plug member is mounted for universal movement so that greater manufacturing tolerances can be used in machining the valve plug and the valve seat thus making the valve more economical to produce. As seen in FIG. 8, the valve plug 140 is formed as a partial sphere with a flat lower surface 141 being adapted to seal against the upper annular face of a ceramic valve seat 146. In the manner previously described, the ceramic valve seat 146 can be inserted within the metallic mounting member 148 by a heat shrinking process. The valve plug 140 is swaged into a retainer member 142 in a spherically shaped socket so that it will be slightly loose and free to swivel in the socket. The retainer 142 is attached to a valve stem 144 for operation in the manner previously described.

With no upward pressure on the valve plug the force imposed by spring 149 forces the plug and its retainer 142 downwardly against the valve seat 146. When the plug engages the seat the plug will swivel in its retainer until perfect alignment is achieved. Thus, a perfect seal is assured when fluid pressure is applied to the valve. When fluid pressure in the valve overcomes the force of spring 149, the plug is lifted off the seat to relieve the pressure. In order to insure that the face 141 of the plug and the seat remain parallel when the plug is lifted, a pressure bleed hole 150 is provided in the retainer so that fluid pressure will be applied to the spherical top surface of the plug to force it downwardly against the swaged lip 143 of the retainer and prevent it from swiveling.

FIGS. 9 and 10 illustrate the internal pressures developed in the representative prior art relief valve of FIG. 6 and in the relief valve of the present invention as shown in FIG. 2, respectively, for variable flow rates. It will be noted that the internal pressures within the prior art valve vary considerably as the flow rate decreases. By contrast, the relief valve of the present invention maintains a nearly uniform pressure (to within 15% of the reference value) down to flow rates of approximately 5 gallons per minute. It has recently been determined that the "knee" in each of the curves in FIG. 9 can be made to occur at ½-1 gallon per minute flow rate with the relief valve of the present invention.

Although the best modes contemplated for carrying out the present invention has been herein shown and described, it will be apparent that modification and variations may be made without departing from what is regarded to be the subject matter of the invention.

What is claimed is:

1. An improved spray system of the type including a plurality of spray nozzles, a fluid flow line connected to said nozzles, means for supplying fluid to be sprayed under pressure to said flow line, and a relief valve assembly operatively associated with said flow line for bypassing fluid from said line when the pressure in said line exceeds a preselected magnitude, wherein the improvement comprises a relief valve assembly including: a valve housing having an inlet port which communicates with said fluid flow line and a bypass port for bypassing fluid from said fluid flow line; a valve seat having a bypass passageway extending therethrough which permits bypass flow from said inlet port to said bypass port; said housing including a member having a bore therein which is axially aligned with said bypass passageway and a spring chamber means aligned with said bore; plug means which is centered relative to the inlet of said bypass passageway and which is shiftable within said housing bore from said valve seat for permitting bypass flow through said bypass passageway, said plug means including means for forming a substantially fluid-tight sliding seal with said bore; spring means within said spring chamber means for biasing said plug means toward said seat; control surface means exposed to the fluid pressure in the valve for creating a lifting force on the plug which shifts said plug means counter to the biasing force exerted by said spring means when the fluid pressure at said inlet port exceeds preselected magnitude, thereby permitting bypass flow through said bypass passageway to maintain the pressure in said flow line at a constant level, with said spring means exerting increasingly greater biasing force on said plug means as said plug means is shifted away from said seat, and means disposed circumferentially about the inlet to said bypass passageway for producing a stagnation pressure acting on said plug means which is additive to the lifting force and provided by the fluid flow pressure on the control surface means and which is thus opposed to said biasing force, said stagnation pressure producing means including opposed, parallel, and flat annular surfaces on said plug means and seat for directing bypass flow radially inwardly to impinge upon itself directly below the center of the bottom surface of said plug means, with said stagnation pressure producing means producing greater stagnation pressure with increasing energy of the stagnating bypass flow into the contiguous bypass passageway to thereby counteract increasing biasing forces resulting from said plug means being shifted further away from said seat, whereby the pressure in said fluid flow line may be maintained substantially constant over a wide range of flow rates through the fluid flow line irrespective of the diameter of said bypass passageway in said seat.

2. The improved spray system according to claim 1 further comprising means for adjusting the biasing force provided by said spring means so that said relief valve, and thus the fluid flow system connected to the inlet port thereof, can be operated throughout a range of fluid pressures.

3. An improved spray system of the type including a plurality of spray nozzles, a fluid flow line connected to said nozzles, means for supplying fluid to be sprayed under pressure to said flow line, and a relief valve assembly operatively associated with said flow line for bypassing fluid from said line when the pressure in said line exceeds a preselected magnitude, wherein the improvement comprises a relief valve assembly including: a valve housing having an inlet port which communicates with said fluid flow line and a bypass port for bypassing fluid from siad fluid flow line; a valve seat having a bypass passageway extending therethrough which permits bypass flow from said inlet port to said bypass port; said housing including a member having a bore therein which is axially aligned with said bypass passageway and a spring chamber means aligned with said bore; plug means which is centered relative to the inlet of said bypass passageway and which is shiftable within said housing bore from said valve seat for permitting bypass flow through said bypass passageway, said plug means including means for forming a substantially fluid-tight sliding seal with said bore; spring means within said spring chamber means for biasing said plug means toward said seat; control surface means exposed to the fluid pressure in the valve for creating a lifting force on the plug which shifts said plug means counter to the biasing force exerted by said spring means when the fluid pressure at said inlet port exceeds preselected magnitude, thereby permitting bypass flow through said bypass passageway to maintain the pressure in said flow line at a constant level, with said spring means exerting increasingly greater biasing force on said plug means as said plug means is shifted away from said seat, and means disposed circumferentially about the inlet to said bypass passageway for producing a stagnation pressure acting on said plug means which is additive to the lifting force and provided by the fluid flow pressure on the control surface means and which is thus opposed to said biasing force, said stagnation pressure producing means including opposed, parallel, and flat annular surfaces on said plug means and seat for directing bypass flow radially inwardly to impinge upon itself directly below the center of the bottom surface of said plug means, with said stagnation pressure producing means producing greater stagnation pressure with increasing energy of the stagnating bypass flow into the contiguous bypass passageway to thereby counteract increasing biasing forces resulting from said plug means being shifted further away from said seat, whereby the pressure in said fluid flow line may be maintained substantially constant over a wide range of flow rates through the fluid flow line irrespective of the diameter of said bypass passageway in said seat, said bypass passageway being significantly larger than the passage between said annular surfaces during normal valve operation so that said bypass passageway provides no restriction to flow through said valve so as to increase the pressure within said valve.

* * * * *